(12) United States Patent
McLelland et al.

(10) Patent No.: US 7,878,215 B2
(45) Date of Patent: Feb. 1, 2011

(54) IMPULSE ACTUATED VALVE

(75) Inventors: Mark McLelland, Raytown, MO (US);
Bradford T. Stilwell, Blue Springs, MO (US); Bon F. Shaw, Blue Springs, MO (US); Michael D. Krebill, Lee's Summit, MO (US); DeVang Patel, Mill Hill (GB); John K. Schaefer, Knoxville, TN (US)

(73) Assignee: Fike Corporation, Blue Springs, MO (US)

( * ) Notice: Subject to any disclaimer, the term of this patent is extended or adjusted under 35 U.S.C. 154(b) by 251 days.

(21) Appl. No.: 12/275,724

(22) Filed: Nov. 21, 2008

(65) Prior Publication Data
US 2010/0127195 A1   May 27, 2010

(51) Int. Cl.
*F16K 17/16* (2006.01)
*F16K 17/40* (2006.01)
*F16K 31/44* (2006.01)

(52) U.S. Cl. .................. 137/68.26; 137/68.13; 137/67

(58) Field of Classification Search .................. 137/67, 137/68.11, 68.13, 68.19, 68.23, 68.26, 68.29, 137/68.3
See application file for complete search history.

(56) References Cited

U.S. PATENT DOCUMENTS

| | | |
|---|---|---|
| 1,671,368 A | 5/1928 | Johann |
| 2,206,818 A | 7/1940 | Mapes |
| 2,417,082 A | 3/1947 | Mapes et al. |
| 2,441,011 A | 5/1948 | Dodelin |
| 2,766,832 A | 10/1956 | Mathisen |
| 3,027,903 A | 4/1962 | Thorp, Jr. |
| 3,101,733 A | 8/1963 | Lord |
| 3,129,716 A | 4/1964 | Fox |
| 3,134,390 A | 5/1964 | Porter |
| 3,196,610 A * | 7/1965 | Anderson ................ 137/68.26 |
| 3,604,511 A | 9/1971 | Griffith et al. |
| 3,811,511 A | 5/1974 | McCulloch |
| 3,931,604 A | 1/1976 | Treynor |
| 3,938,704 A | 2/1976 | Milgram |
| 4,006,780 A | 2/1977 | Zehr |
| 4,046,156 A | 9/1977 | Cook |
| RE29,614 E | 4/1978 | Zehr |
| 4,084,602 A | 4/1978 | Cook |
| 4,263,971 A | 4/1981 | Spector et al. |
| 4,421,005 A | 12/1983 | Byrne |
| 4,542,761 A | 9/1985 | Scott |
| 4,566,476 A | 1/1986 | Fallon et al. |
| 4,630,682 A | 12/1986 | Pieczykolan |
| 4,779,683 A | 10/1988 | Enk |
| 4,830,052 A | 5/1989 | Oberlin et al. |
| 4,838,447 A | 6/1989 | Albracht et al. |

(Continued)

*Primary Examiner*—John Rivell
(74) *Attorney, Agent, or Firm*—Hovey Williams LLP (57) ABSTRACT

A valve for controlling flow of pressurized fluid from a confined area that is operable to relieve an overpressure condition as well as to allow flow of fluid in response to a pressure relief command. The valve including a valve body with a fluid passage therethrough, a reverse buckling rupture disc in the valve body in normally blocking relationship to the flow of fluid through the passage, and a selectively actuatable device carried by the valve body adjacent the convex surface. The actuatable device is operable to disrupt, without puncturing, the disc so as to initiate reversal and rupture of the disc and to permit flow of the pressurized fluid through the passage.

19 Claims, 10 Drawing Sheets

U.S. PATENT DOCUMENTS

| | | |
|---|---|---|
| 5,010,911 A | 4/1991 | Grant |
| 5,076,312 A | 12/1991 | Powell |
| 5,257,819 A | 11/1993 | Frantom et al. |
| 5,345,876 A | 9/1994 | Rose et al. |
| 5,934,308 A * | 8/1999 | Farwell .................. 137/68.26 |
| 6,178,983 B1 * | 1/2001 | Culliinane et al. ....... 137/68.26 |
| 6,234,522 B1 | 5/2001 | Albrecht et al. |
| 6,240,948 B1 | 6/2001 | Hansen, III et al. |
| 6,672,616 B2 | 1/2004 | Jonsson et al. |
| 6,748,783 B1 | 6/2004 | Chubb et al. |
| 6,755,439 B2 | 6/2004 | Nanbu |
| 6,834,885 B2 | 12/2004 | Mizuno et al. |
| 6,938,421 B2 | 9/2005 | Foster-Pegg |
| 7,140,381 B2 | 11/2006 | Sundholm et al. |
| 7,143,775 B2 | 12/2006 | Sundholm et al. |
| 7,143,776 B2 | 12/2006 | Sundholm |
| 2005/0150546 A1 | 7/2005 | Liepold et al. |
| 2005/0205613 A1 | 9/2005 | Karalis et al. |
| 2006/0137742 A1 | 6/2006 | Smith et al. |
| 2006/0157107 A1 | 7/2006 | Krebill et al. |

* cited by examiner

IMPULSE ACTUATED VALVE

BACKGROUND OF THE INVENTION

1. Field of the Invention

This invention relates to a valve for controlling flow of pressurized fluid leading from a confined area and that is operable to relieve an overpressure condition, as well as to allow flow of fluid along the path thereof in response to a pressure relief command. The valve includes a valve body provided with a fluid passage and that is adapted to be mounted in the fluid path. A reverse buckling rupture disc in the valve body is in normal blocking relationship to flow of fluid through the valve passage. The disc, which is oriented such that the convex surface thereof is in facing relationship to the pressurized fluid, is capable of reversing when subjected to a predetermined overpressure condition. A selectively actuatable device carried by the valve body adjacent the convex surface thereof is operable upon actuation to disrupt, without puncturing, the disc to an extent that reversal of the disc is initiated by the pressurized fluid to allow flow of fluid through the valve body passage.

Thus, the valve preferably serves a dual function in which the disc reverses and relieves a predetermined fluid overpressure condition, while at the same time being selectively actuatable to cause the disc to reverse and allow flow of pressurized fluid through the valve body at a selected lower fluid pressure.

2. Description of the Prior Art

Protective overpressure devices, provided with a reverse acting rupture disc having a convex-concavo central section, have long been employed to relieve overpressure conditions existing in vessels and conduits leading from a confined area. The convex face of the rupture disc has been disposed in facing relationship to the fluid pressure. When a predetermined overpressure condition arose, the central section of the disc reversed, thereby opening, and allowing the pressurized fluid to escape from the confined area. One or more knives were provided, in certain instances, adjacent the concave face of the disc to sever the central section of the disc upon reversal in order to assure full opening thereof. A variety of backup components for the ruptured central section of the disc have been mounted in the overpressure device proximal to the concave face of the disc in disposition to be engaged by and minimize separation of the reversed central section of the disc from the peripheral flange portion thereof.

These prior art devices have all been functional to relieve a predetermined overpressure condition, and were not operable to selectively reverse and open at a predetermined fluid overpressure significantly less than the withstand pressure of the central section of the disc.

The prior art is also replete with valves that utilize a shiftable device for penetrating a rupture disc to effect opening thereof and thereby release a pressurized fluid from a confined area. Included are darts or sharpened members that are propelled into engagement and through the disc, as exemplified by the devices in U.S. Pat. Nos. 2,206,818, 2,441,011, 3,134,390, 3,913,604, 3,938,704, 4,566,476, 4,830,052, 5,010,911, 5,076,312, 5,257,819, 6,672,616, 6,748,743, 6,834,885, and 6,938,421. Piston-like members have also been provided that are shiftable into and through a rupture disc to effect bursting thereof. Examples of piston-type actuators are found in U.S. Pat. Nos. 1,671,368, 2,417,082, 3,027,903, 3,101,733, 3,129,716, Re. 29,614, U.S. Pat. Nos. 4,006,780, 4,421,005, 4,542,761, 4,630,682, 5,345,876, 6,234,522, 6,755,439, 7,140,381, 7,143,775, and 7,143,776, and Publication No. US 2006/0137742. Other valves rely upon an explosive charge to effect opening of a rupture disc. Exemplary explosively actuated valves are disclosed in U.S. Pat. Nos. 2,766,832, 3,604,511, 3,811,511, 4,046,156, 4,084,602, 4,263,971, 4,779,683, and 6,240,948.

SUMMARY OF THE INVENTION

A valve is provided for controlling flow of pressurized fluid along a path leading from a confined area. The valve includes a valve body provided with a fluid passage and that is adapted to be positioned in the path of the pressurized fluid. A reverse buckling (or reverse acting) rupture disc is mounted in the valve body in normal blocking relationship to flow of fluid through the valve body passage. The rupture disc has a bulged central section presenting generally opposed convex and concave surfaces. The convex surface of the disc is positioned in facing relationship to the pressurized fluid. A selectively actuatable device is carried by the body in disposition adjacent the convex surface of the central section of the disc. The device is operable upon selective actuation to disrupt, without puncturing, the disc to an extent that reversal of the central section of the disc is initiated by the pressurized fluid in the valve body passage, thereby allowing free flow of pressurized fluid through the valve body.

The selectively actuatable device includes a shiftable member normally spaced from the convex surface of the disc and movable through a predetermined displacement upon actuation to engage the convex surface and effect mechanical disruption thereof without puncture of the central section. The shiftable member preferably is a rod having a blunt end positioned to engage the convex surface of the central section of the disc.

A pyrotechnic charge is associated with the shiftable member and is operable to shift the member through its predetermined displacement upon ignition of the charge. The central section of the disc reverses at a faster rate than movement of the member toward the disc upon initiation of reversal of the central section of the disc. The shiftable member is movable along a generally rectilinear path of travel at an angle with respect to the proximal surface of the convex face of the disc, or along a curvilinear path. In most instances, the shiftable member is movable along a path of travel no more than from about 6 mm to about 12 mm.

In a preferred embodiment of the invention, the reverse buckling rupture disc is of one piece metal and the bulged central section of the disc has a segment defining a discrete region in which the metal of the segment has altered grain structure that exhibits greater residual stress than the metal of the remainder of the central section of the disc. Reversal of the central section of the disc is initiated at the discrete region thereof. The convex surface and the concave face of the central section of the disc are smooth and of uninterrupted configuration throughout the entire area thereof, including the segment defining the discrete region having greater residual stress. The actuatable member is positioned to engage the high stress region of the disc to effect initiation of disruption of the central section of the disc at the discrete region.

DETAILED DESCRIPTION OF THE DRAWINGS

The following description sets forth exemplary embodiments according to the present invention. It is to be understood, however, that these embodiments are provided by way of illustration and nothing therein should be taken as a limitation upon the overall scope of the invention.

Figure 1:
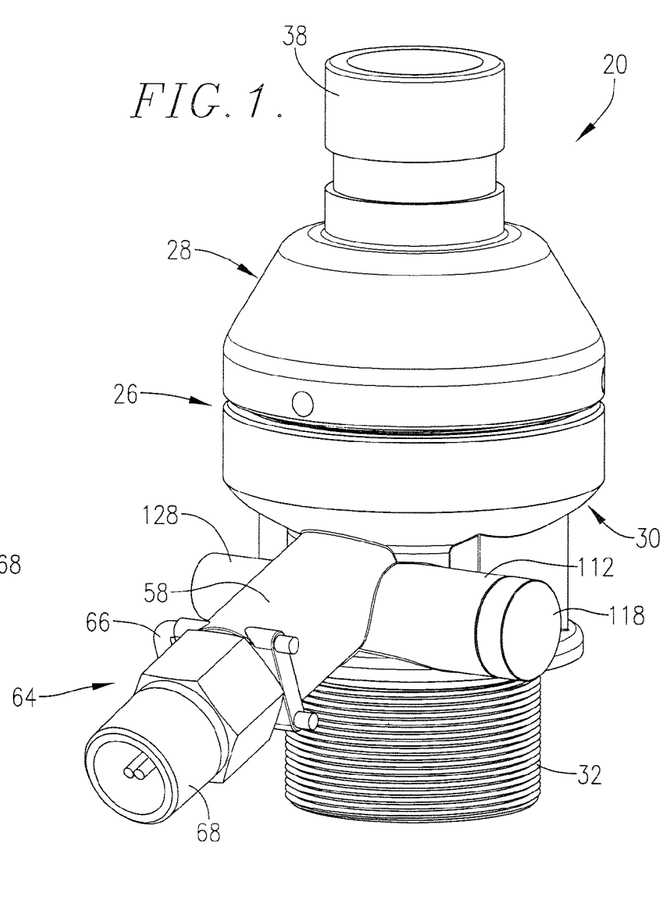
FIG. 1 is a perspective view of one side of a valve for controlling flow of pressurized fluid along a path leading from a confined area.
Figure 2:
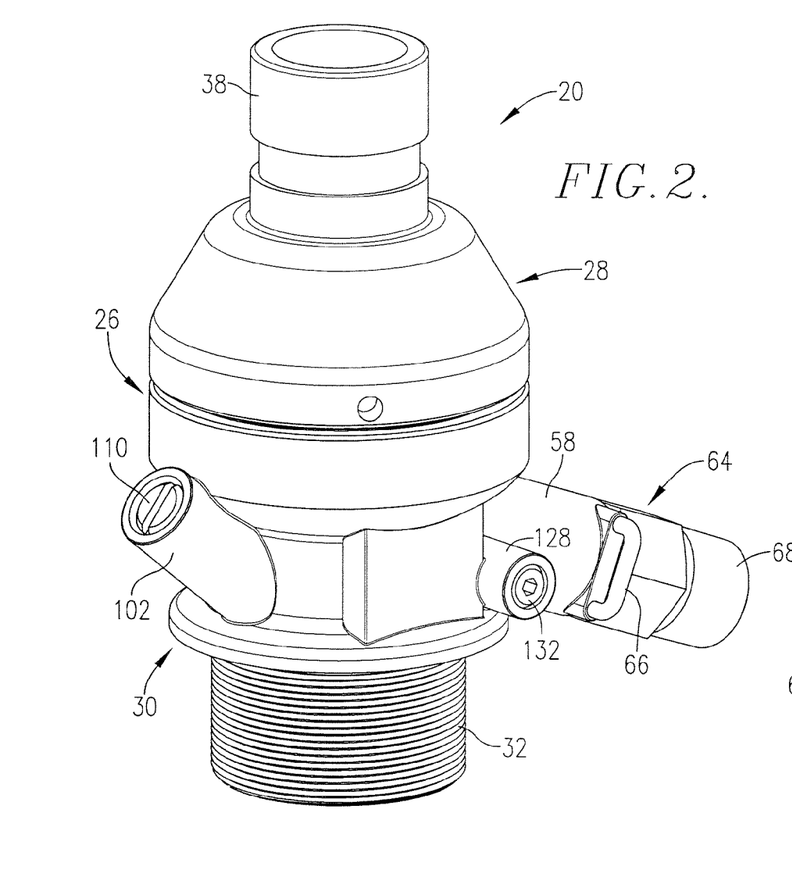
FIG. 2 is a perspective view of the other side of the valve shown in FIG. 1.

Turning now to FIGS. 1 and 2, the valve 20 of this invention has any one of a number of uses for releasing pressure from a confined space when that pressure exceeds a predetermined value, and for effecting selective release of pressurized fluid upon command. One form of valve 20, as depicted in the drawings, is especially adapted to be connected to the internally-threaded neck 22 of a vessel 24, shown as being in a conventional upright position, is adapted to contain a source of pressurized fluid, such as a fire or explosion suppression agent. It is to be understood, however, that vessel 24 may be oriented other than upright. An O-ring 25 is provided to ensure a fluid-tight seal between valve 20 and vessel 24. Valve 20 includes a two-piece body, broadly designated 26, having a cylindrical upper section 28 and a separate cylindrical lower section 30. Lower valve body section 30 has an externally threaded lowermost portion 32 that is adapted to be threaded into neck 22 of vessel 24. The externally-threaded lower portion 34 of upper cylindrical section 28 of valve 20 is adapted to be threaded into the internally-threaded upper segment 36 of lower body section 30. The uppermost segment 38 of upper body section 28 is adapted to be coupled to a suppressant delivery line through conventional piping or the like, that leads to a respective suppressant delivery nozzle.

Figures 4, 11:
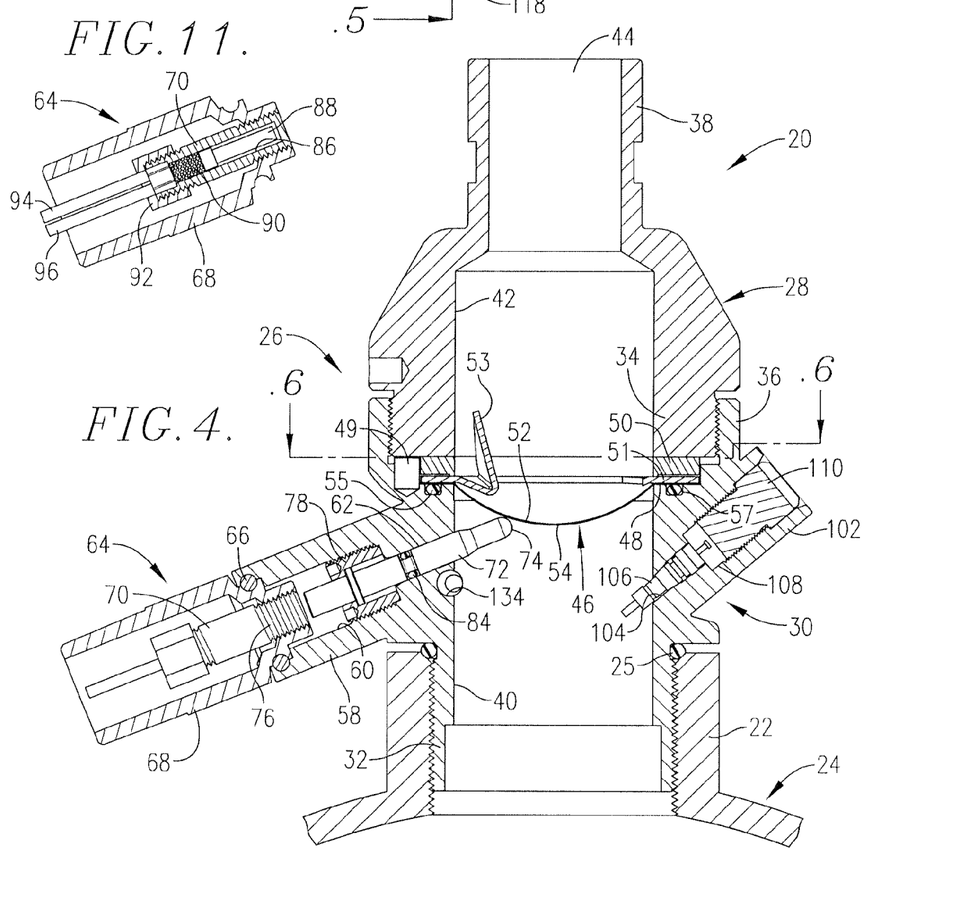
FIG. 4 is a vertical cross-sectional view of the valve taken substantially along the line 4-4 of FIG. 3 and looking in the direction of the arrows.
FIG. 11 is a fragmentary cross-sectional view of the selectively actuatable device having a shiftable member movable into engagement with the convex face of the disc, as shown in FIG. 4.

The lower valve body section 30 of valve 20 has a fluid flow passage 40 therethrough that is axially-aligned with a fluid flow passage 42 through valve body section 28, that is of essentially the same diameter as passage 40. The suppressant delivery segment 38 of valve body 26 has a passage 44 that communicates with passage 42, but is of a smaller diameter, as shown in FIG. 4.

Figure 3:
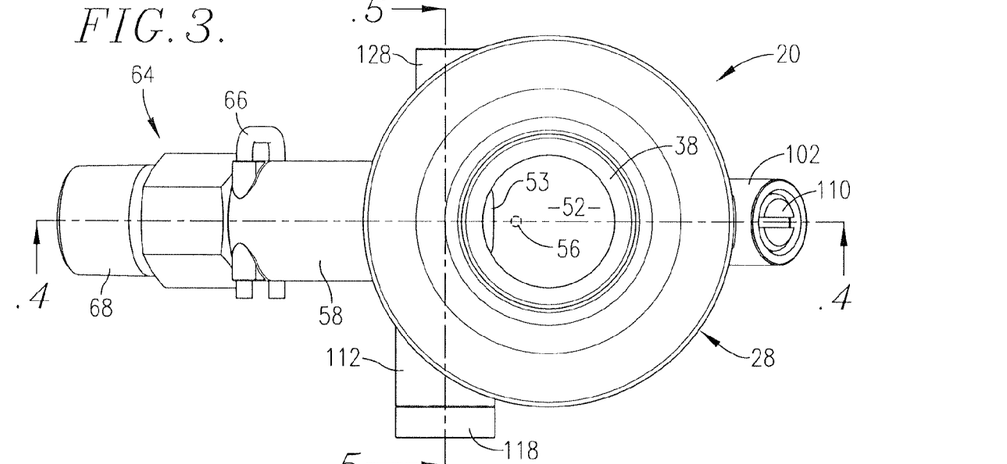
FIG. 3 is a plan view of the valve.

A reverse buckling rupture disc 46 is positioned in normal blocking relationship to passages 40 and 42. Disc 46 has a circumscribing flange 48 that is trapped between adjacent margins of upper valve body section 28 and lower valve body section 30. Disc 46 has a central concavo-convex bulged section 52, in which the convex surface 54 is in facing relationship to the pressurized fluid in vessel 24. In one embodiment of the present invention, the bulged central section 52 of disc 46 has a segment 56 (FIG. 3) defining a discrete region in which the metal of segment 56 has altered grain structure that exhibits greater residual stress than the metal of the remainder of the bulged section 52 of disc 46. A relatively small diameter region of bulged section 52 having the residual stress characteristics of segment 56 is described and illustrated in detail in the U.S. Pat. No. 6,945,420, which is incorporated herein by reference in its entirety. Preferably, segment 56 is located intermediate the center of rupture disc 46 and the circumferentially-extending transition area between bulged section 52 and flange 48.

An annular clamping ring 50 and a backup ring 51 are interposed between the lowermost annular edge of upper body section 28 and the flange 48 of disc 46. Backup ring 51 presents an inwardly extending flange 53 that functions as a support for the bulged section 52, and particularly the "hinged" portion thereof (i.e., that portion of bulged section 52 which remains attached to flange 48 upon rupture of the disc) and is explained in greater detail below. An O-ring 55 is provided in a circumscribing channel 57 formed in lower valve body section 30 to assist in forming a fluid-tight seal between rupture disc flange 48 and lower valve body section 30. Locator pins 49 cooperate with corresponding grooves 43, 45, and 47 formed in rings 50, 51 and disc flange 48, respectively, to ensure proper orientation of rings 50, 51 and disc 46 when installed within valve body 26.

The lower body section 30 of valve 20 has an integral cylindrical protuberance 58, that is at an angle with respect to the axis of passage 40. An outwardly-opening passage 60 in protuberance 58 communicates with a smaller diameter passage 62 that extends to passage 40 in lower body section 30. An actuator assembly 64 is received in passages 60, 62 and secured to protuberance 58 by retaining clip 66. Actuator assembly 64 generally comprises a cylindrical actuator body 68, through which is received a thruster mechanism 70. Thruster mechanism 70 may be a METRON actuator available from Nobel Enterprises, or other similar type of device. In certain embodiments, the pyrotechnically fired thruster mechanism 70 could be replaced with a solenoid-type thruster mechanism, particularly in applications where activation speed is not critical. Actuator assembly 64 includes an elongated rod or strike pin 72 that extends through passage 62 into passage 40 in lower body section 30. As shown in FIG. 4, strike pin 72 presents a blunt outboard tip 74 that is normally located adjacent, although in spaced relationship with, the convex surface 54 of disc 46 when pin 72 is in its non-actuated position.

Thruster mechanism 70 is received in actuator body 68 and secured in place by threads 76. The throw of strike pin 72 is limited by retainer 78 that is threadably received within protuberance 58. An O-ring 84 is disposed in a recessed portion of strike pin 72 to prevent fluid within vessel 24 from escaping the valve through passage 62.

Figures 8, 12:
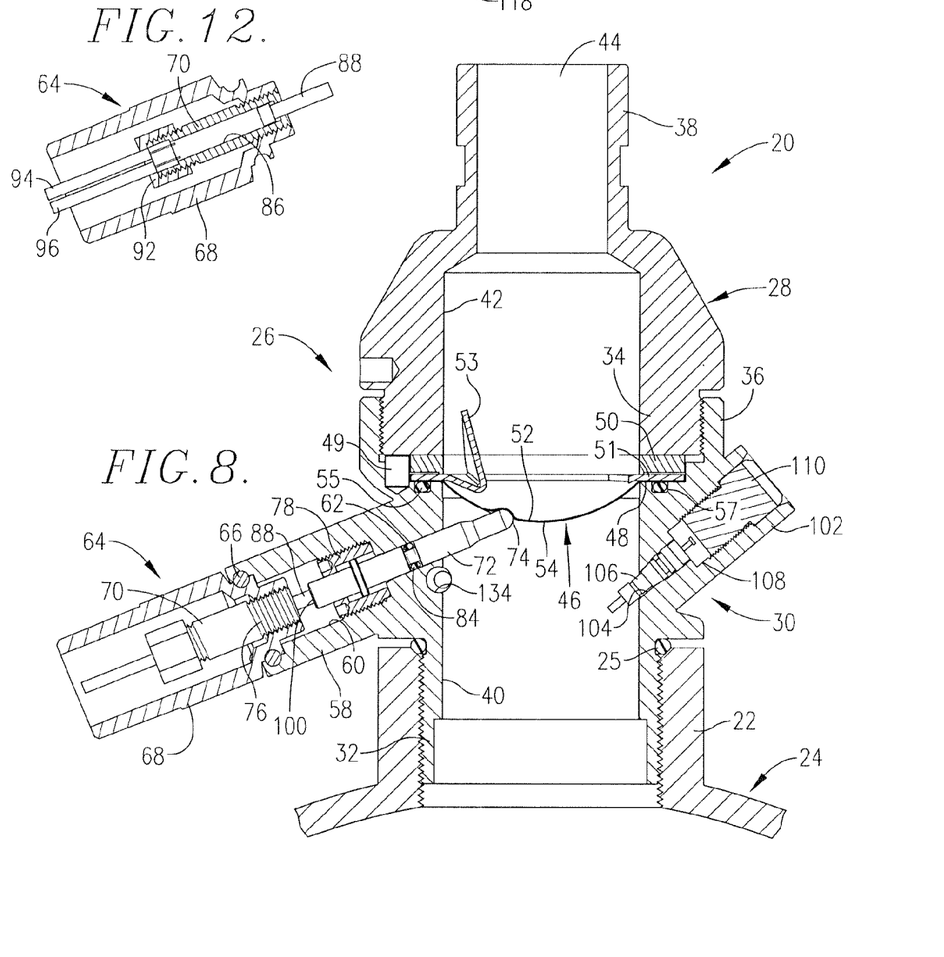
FIG. 8 is a vertical cross-sectional view of the valve similar to FIG. 4 and diagrammatically illustrating the selectively actuatable device in the disposition thereof that would cause disruption without puncturing the disc, thereby initiating reversal of the central section of the disc.
FIG. 12 is a fragmentary cross-sectional view of the selectively actuatable device illustrating the shiftable member thereof in its actuated position.

As shown in FIG. 11, thruster mechanism 70 comprises a cylindrical chamber 86 in which is disposed a firing pin 88 and a combustible pyrotechnic charge 90. Chamber 86 is sealed on one end by a packing plug 92 through which extend a pair of lead wires 94, 96. Upon actuation of thruster mechanism 70, the exposed ends of lead wires 94, 96 positioned within chamber 86 ignite pyrotechnic charge 90. Ignition of charge 90 shifts firing pin 88 to the actuated position as shown in FIG. 12. In certain embodiments, the throw or linear displacement of firing pin 88 (and consequently of strike pin 72) is between about 6 to about 12 mm, and preferably about 9 mm. As explained below, upon actuation, firing pin 88 contacts and/or acts upon end 100 of strike pin 72 thereby causing strike pin 72 to shift to the actuated position and strike rupture disc 46.

Lower valve body section 30 also presents a side port 102 extending outwardly and obliquely therefrom. Side port 102 presents a frustoconically shaped passage 104 in which a shrader valve 106 is disposed. Passage 104 is in communication with a bore 108 presenting a larger diameter. As shown in FIG. 4, a plug 110 is threadably received within bore 108. However, bore 106 may also be outfitted with a pressure gauge so that the pressure of fluid within passage 40 and vessel 24 may be monitored.

Figure 5:
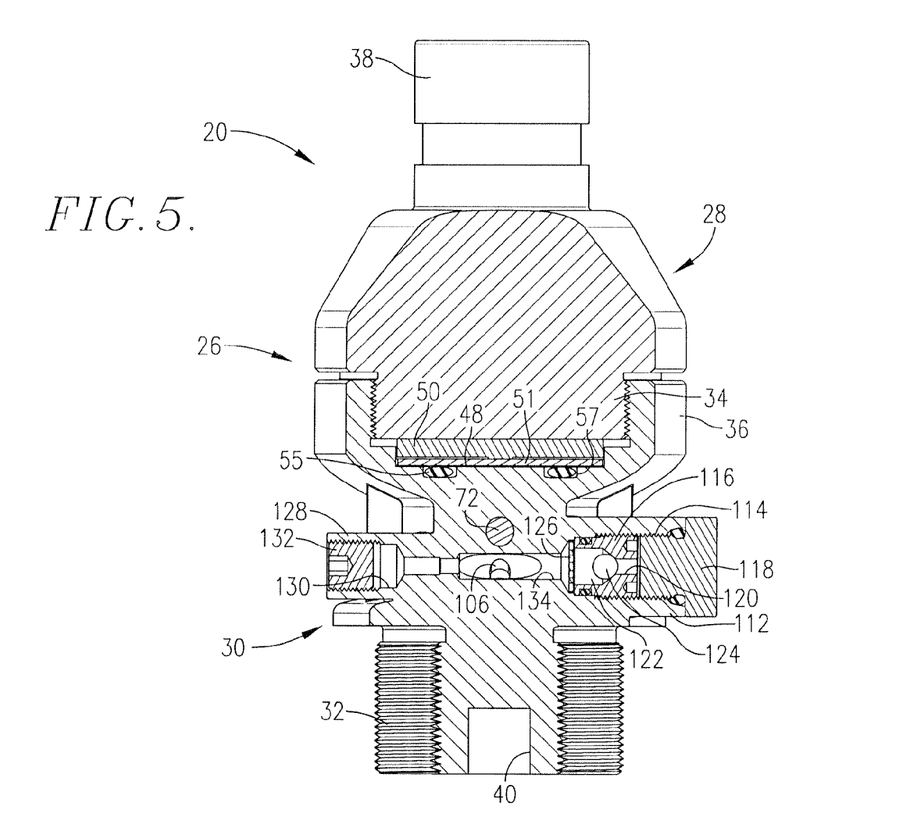
FIG. 5 is a vertical cross-sectional view of the valve taken substantially along the line 5-5 of FIG. 3 and looking in the direction of the arrows.
Figure 6:
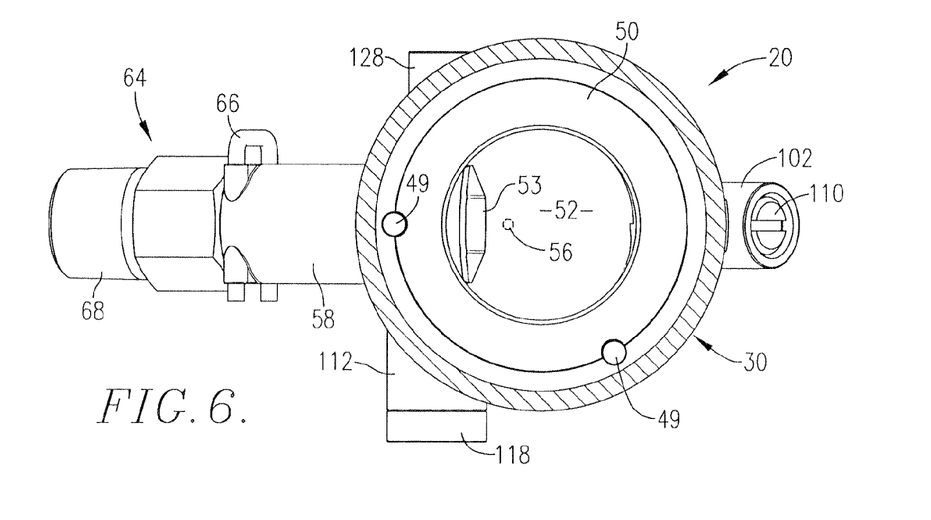
FIG. 6 is a horizontal cross-sectional view of the valve taken substantially along the line 6-6 of FIG. 4 and looking in the direction of the arrows.
Figure 7:
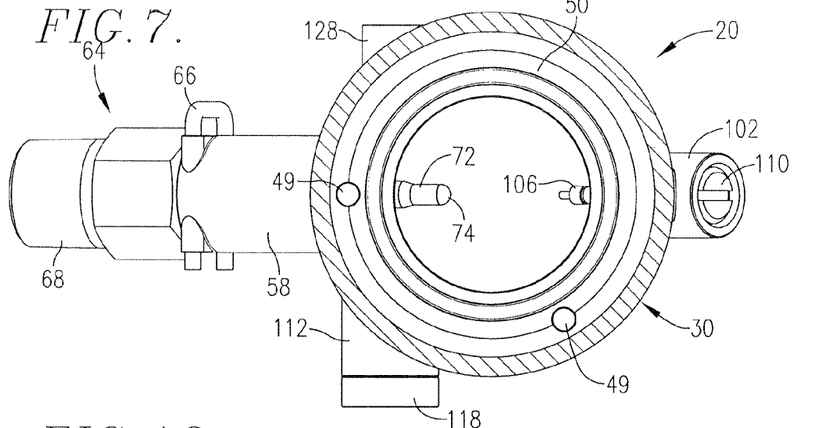
FIG. 7 a horizontal cross-sectional view of the valve of FIG. 6 with the rupture disc assembly removed.

Lower valve body section 30 also presents a laterally extending fill port 112 that may be used to charge vessel 24 with the desired fluid after installation of valve 20 thereon. As shown in FIG. 5, fill port 112 comprises a generally cylindrical bore 114 in which a fill port insert 116 and fill port plug 118 are normally disposed and threadably secured therein. Fill port insert 116 is essentially a check valve that presents a first passage 120 that communicates with a second passage 122, the first passage 120 presenting a diameter that is less than the diameter of the second passage 122. A ball 124 having a diameter that is greater than the diameter of the first passage 120 is disposed within fill port insert 116 and operates to block communication between first passage 120 and second passage 122 when the fluid pressure within passage 40 and vessel 24 is greater than the fluid pressure within first passage 120. Thus, fill port insert 116 generally permits only unidirectional flow of fluid from the fill port bore 114 into the lower valve body section passage 40. A fritted check disc 126 is provided at the end of bore 114 opposite plug 118 to prevent ball 124 from escaping second passage 122 during filling of vessel 24.

An auxiliary port 128 extends outwardly from lower valve body section 30 and presents a generally cylindrical bore 130 therethrough. As shown in FIG. 5, a plug 132 is normally threadably received within bore 130. However, auxiliary apparatus, such as an auxiliary pressure gauge, may be coupled to port 128 in place of plug 132. A passageway 134 communicates fill port bore 114 with lower valve body passage 40 and auxiliary bore 130.

Valve 20 may be used to release pressurized fluid from a confined space through active initiation of the reversal and rupture of rupture disc 46. Valve 20 also provides passive protection against dangerous overpressure conditions within vessel 24 through reversal and rupture of disc 46 should such an overpressure condition come to exist. Thus, reverse buckling rupture disc 46 is capable of withstanding the lower, normal fluid pressures within vessel 24, but also capable of being selectively opened when release of the pressurized fluid is desired. In certain embodiments of the present invention, valve 20 is mounted in the flow path of fire or explosion suppression apparatus to allow flow of a suppressant agent therethrough in response to a pressure relief command. In certain embodiments, the pressure relief command is automatically generated by a detector or sensor located within a space in which the suppression apparatus is installed, however, such command may also be manually given.

Figure 13:
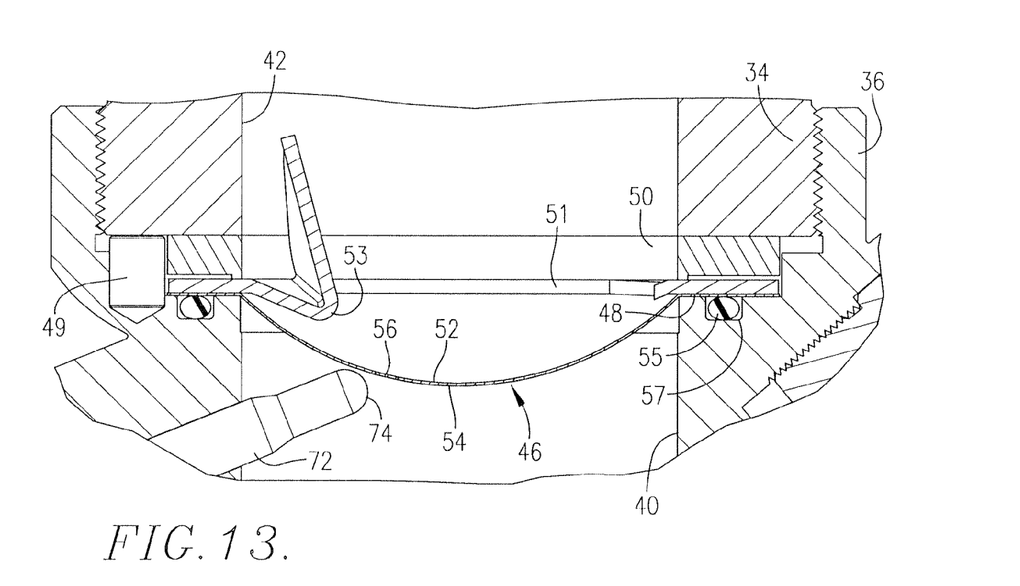
FIG. 13 is a fragmentary enlarged vertical cross-sectional view of a portion of the structure shown in FIG. 4 and better illustrating the disposition of the shiftable member prior to being moved into disrupting engagement with the convex face of the rupture disc.

In its normal, un-actuated configuration, as shown in FIG. 13, strike pin 72 is shown proximate to, but spaced apart from, the convex surface 54 of disc 46. As previously noted, in certain embodiments, disc 46 may be provided with pre-stressed, discrete segment 56 having an altered grain structure than the rest of disc bulged section 52. In one embodiment, strike pin tip 74 is disposed proximate to, but not touching, segment 56. When actuated, tip 74 engages segment 56 to initiate reversal of disc 46. However, in the un-actuated configuration of valve 20, disc 46 effectively contains the pressurized fluid present in passage 40 and vessel 24 by blocking the flow path to passage 42.

Upon detection of a condition (other than an overpressure condition within vessel 24) requiring the release of the pressurized fluid, an electrical signal is transmitted to actuator assembly 64, and specifically, to thruster mechanism 70 via lead wires 94, 96. The electrical signal ignites pyrotechnic charge 90 contained within chamber 86 thereby advancing firing pin 88 toward an extended position as illustrated in FIG. 12. In certain embodiments, the speed at which the firing pin advances is less than the speed of sound, preferably less than 1100 ft/sec. By limiting the speed in this fashion, piercing of the rupture disc 46 and fragmentation of disc 46 upon opening are more reliably avoided. Firing pin 88 contacts the strike pin end 100 thereby causing strike pin to advance along a rectilinear path toward the rupture disc convex surface 54 and come into contact therewith. Strike pin tip 74 is of a rounded shape, as opposed to coming to a sharp point. Thus, when strike pin 72 is shifted through a predetermined displacement, contact with convex surface 54 is sufficient to effect disruption thereof without puncturing disc 46. As shown in FIG. 8, strike pin 72 mechanically disrupts and causes a deformation of the disc bulged section 52, but does not penetrate disc 46. Penetration of disc 46 is undesirable as the pin 74 could simply plug the opening created thereby blocking the flow of fluid into passage 42 and causing the disc to fail to open.

Strike pin 72 imparts sufficient kinetic energy to the disc bulged section 52 such that when combined with the force of the fluid acting upon the disc convex surface 54, disc 46 reverses and opens. More particularly, the force exerted on bulged section 52 by the impact of strike pin 72 coupled with the force exerted by the pressurized fluid is sufficient to initiate reversal and opening of disc 46. In certain embodiments, the central bulged section 52 reverses at a faster rate than the movement of strike pin 72 toward disc 46 upon initiation of reversal of section 52. Thus, full opening of disc 46 is achieved at fluid pressure conditions as low as 20% (one-fifth) of the rated burst pressure of the disc (i.e., the pressure at which the disc will automatically reverse and rupture without the assistance of actuator assembly 64 to a tolerance of ±5%). However, in certain embodiments, full opening of the disc is achieved when the fluid pressure is no more than about one-half of the rated burst pressure. In still other embodiments, full opening of the disc is achieved at between about 25-75% of the rated burst pressure of the disc, and more particularly about 33% of the rated burst pressure of the disc. In certain embodiments of the present invention, full opening of disc 46 may be achieved in as little as 5-10 msec.

In the embodiment shown in FIGS. 1-13, protuberance 58 and actuator assembly 64 are positioned at an oblique angle relative to the fluid flow path through passages 40 and 42. However, it is within the scope of the present invention for protuberance 58 and actuator assembly 64 to be perpendicular or parallel to this flow path. Further, actuator assembly 64 may be configured so that strike pin 72 contacts rupture disc 46 at any portion of the disc's convex surface 54. In one embodiment, strike pin 72 is movable toward central bulged section 52 in generally tangential relationship to convex surface 54. In another embodiment, strike pin 72 is movable toward central bulged section 52 in generally perpendicular relationship to convex surface 54. Regardless of the relative direction of travel, it is preferable to strike the disc at or near its weakest point. In the case of disc 46, strike pin 72 is shown contacting the disc proximate the pre-stressed segment 56 formed in bulged section 52. In the case of other discs not presenting a corresponding segment 56, strike pin 72 may contact the disc at a location toward the peak of the bulged section where the disc material is the thinnest. By striking the disc at or near its weakest point, less kinetic energy is required thereby reducing the likelihood that strike pin 72 will pierce the disc. In whatever actuator assembly configuration selected, to achieve successful selective opening of disc 46, the force vector supplied by pin 72 acting on the disc in the same direction as the force vector supplied by the pressurized fluid will need to be sufficient to initiate reversal and opening of disc 46.

Figure 9:
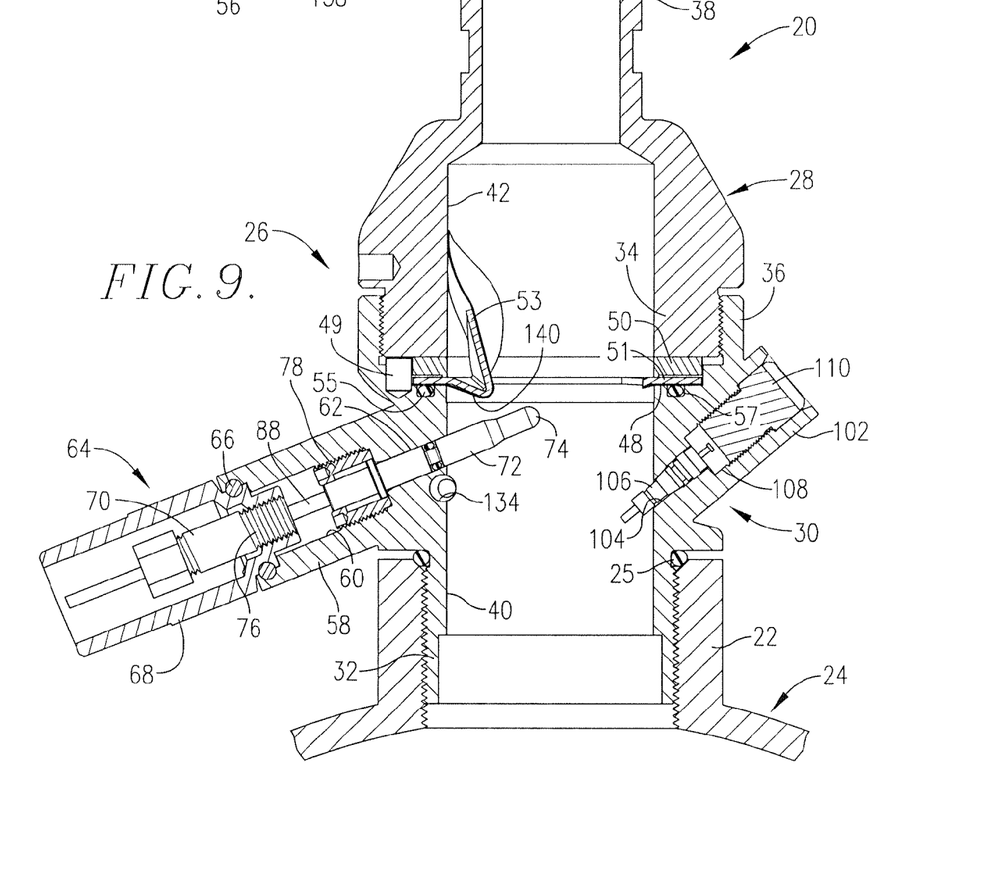
FIG. 9 is a vertical cross-section view of the valve as shown in FIG. 4 and showing the central section of the bulged reverse buckling rupture disc in its fully open position as a result of disruption of the central section thereof by the shiftable member.
Figure 10:
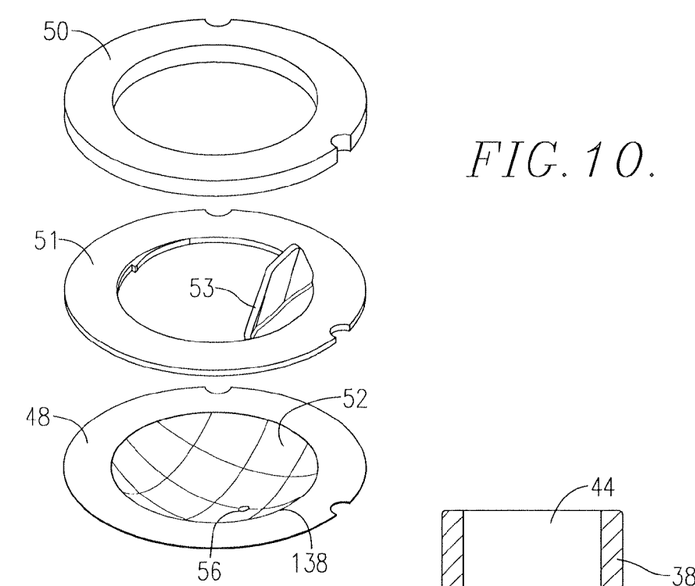
FIG. 10 is an exploded view of the reverse buckling rupture disc, a backup ring associated with the rupture disc and that has a backup segment positioned to be engaged by the central section of the disc upon reversal and opening thereof, and a clamping ring that engages the backup ring.

Reverse buckling rupture disc 46 may be provided with a semicircular score line or line of weakness that is located proximate the transition zone 138 between flange 48 and bulged section 52 (see FIG. 10). Upon actuation of actuator assembly 64 and contact between strike pin 72 and disc convex surface 54, the disc bulged section 56 opens proximate the line of weakness leaving only a small hinge portion 140 attached to flange 46. Upon opening of the disc, hinge portion 140 is supported by flange 53 of backup ring 51. Fluid escaping from vessel 24 through the flow path presented by passages 40, 42 causes disc 46 to fold around flange 53 as shown in FIG. 9. In this manner, flange 53 assists in preventing undesired fragmentation of disc 46. It will be appreciated that other types of non-fragmenting reverse buckling rupture discs may be employed with different score line configurations, such as discs that form a plurality of petals upon opening.

Figure 14:
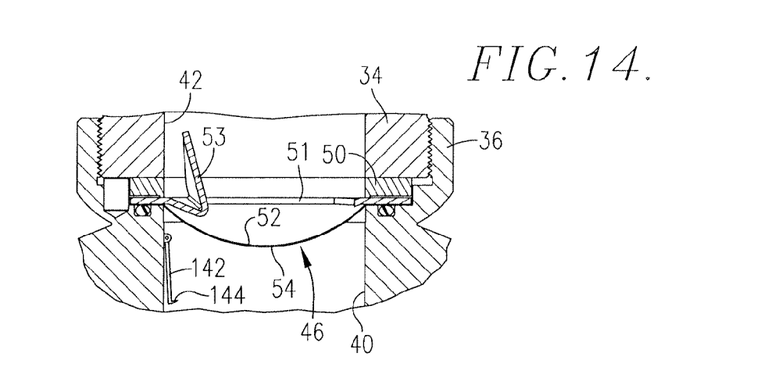
FIG. 14 is a fragmentary vertical cross-sectional view through the valve body and illustrating an alternative pivotal selectively actuatable device for disrupting, without puncturing, the disc to effect reversal of the central section of the disc.
Figure 15:
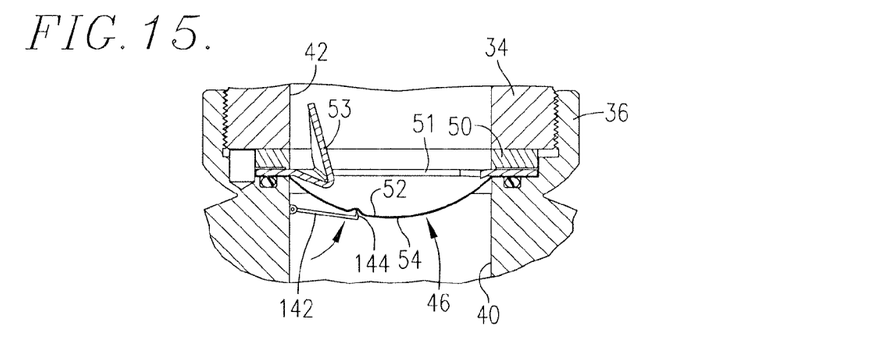
FIG. 15 is a fragmentary vertical cross-sectional view similar to FIG. 14 and showing the pivotal device in its disc-disrupting position.
Figure 16:
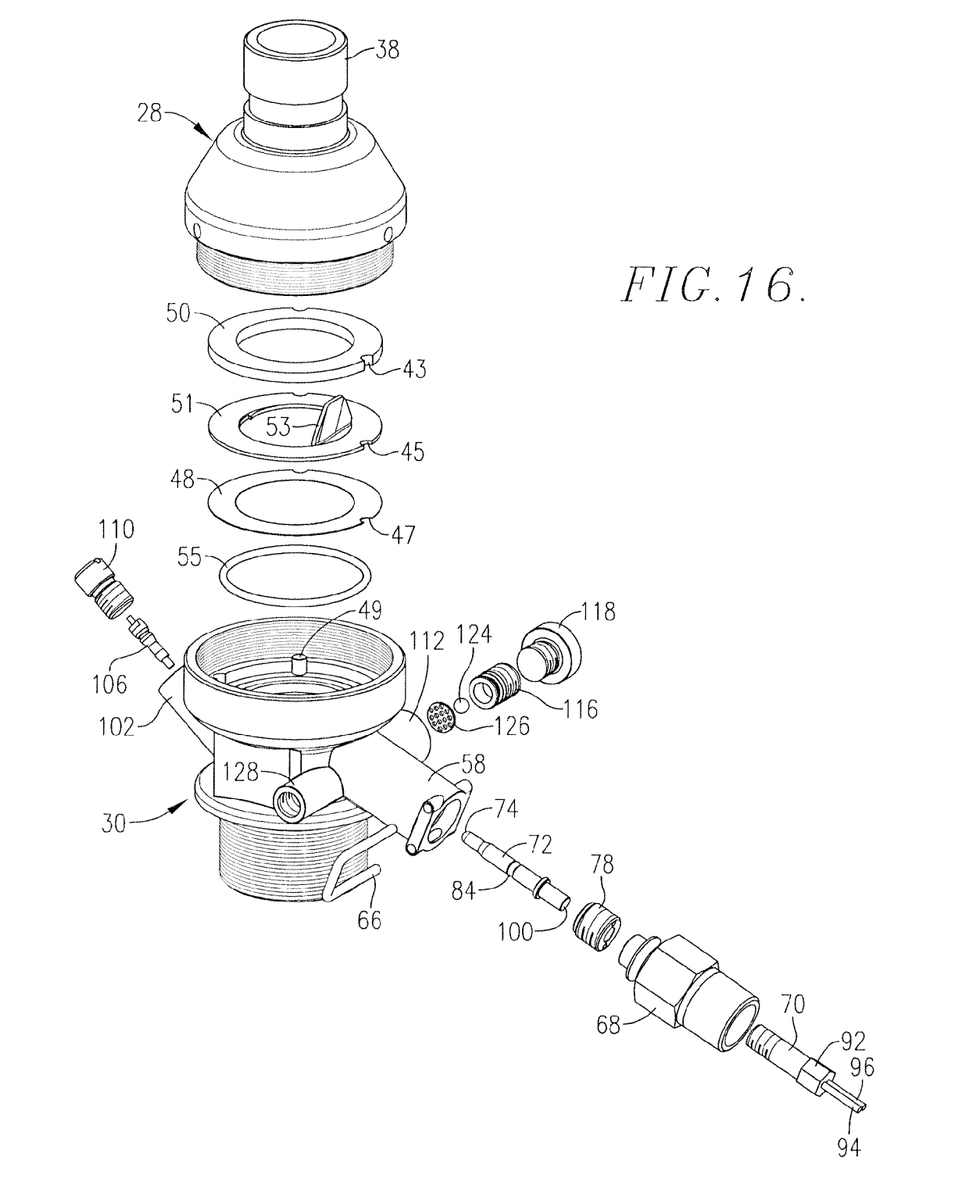
FIG. 16 is an exploded perspective view of the valve illustrating its component parts.

An alternate embodiment of the present invention is depicted in FIGS. 14 and 15. Generally, the valve 20 is configured as described above. However, actuator assembly 64 has been replaced with a swinging arm actuator 142. Actuator 142 includes a laterally extending toe segment 144 configured to contact, but not puncture, convex surface 54 of rupture disc 46. Shifting of actuator 142 along a curvilinear path may be effected by use of a latch and spring mechanism (not shown) or by other means known to those of skill in the art to cause actuator 142 to shift and toe segment 144 to impact convex surface 54.

Figure 17:
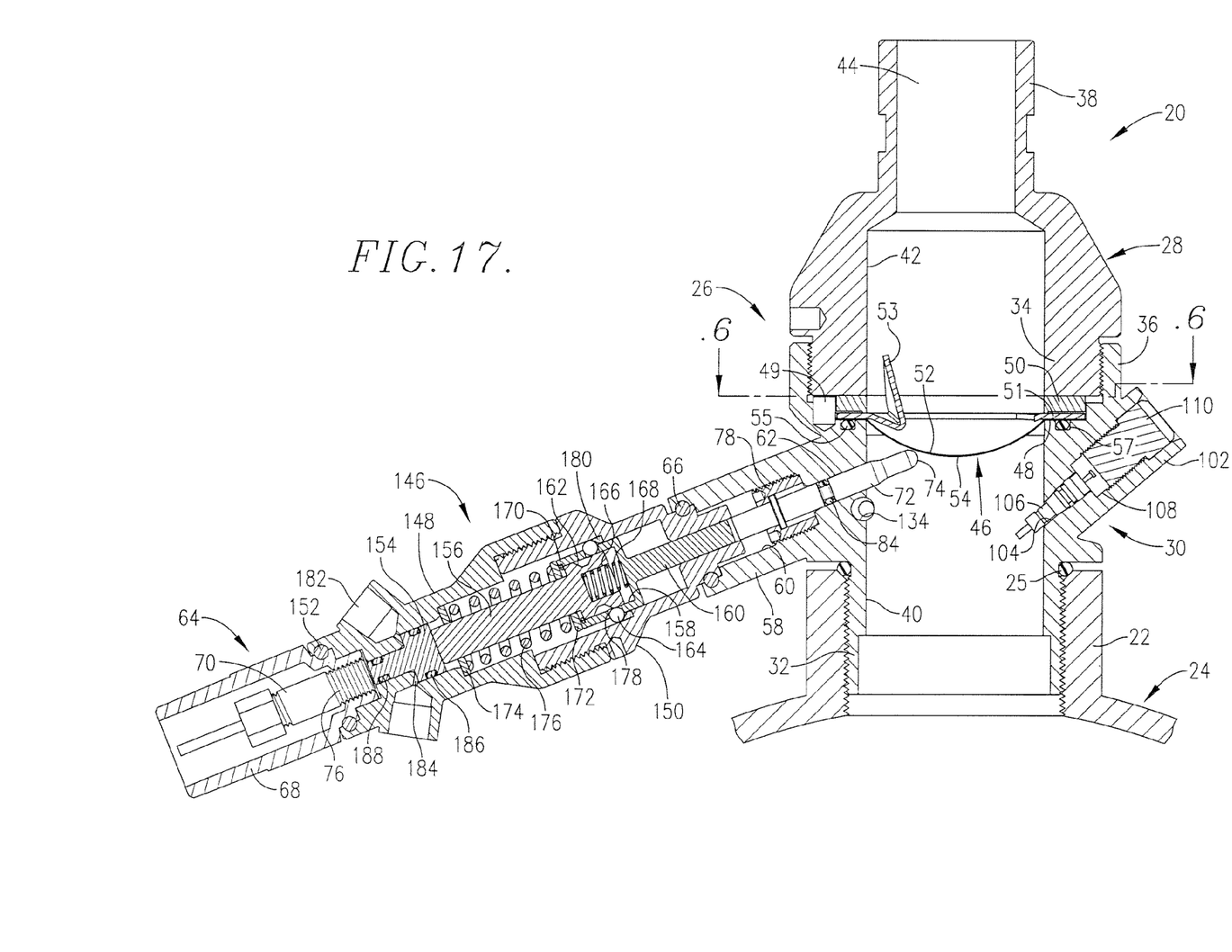
FIG. 17 is a vertical cross-sectional view of an alternate embodiment of the present invention comprising a spring actuator shown in the un-deployed position.
Figure 18:
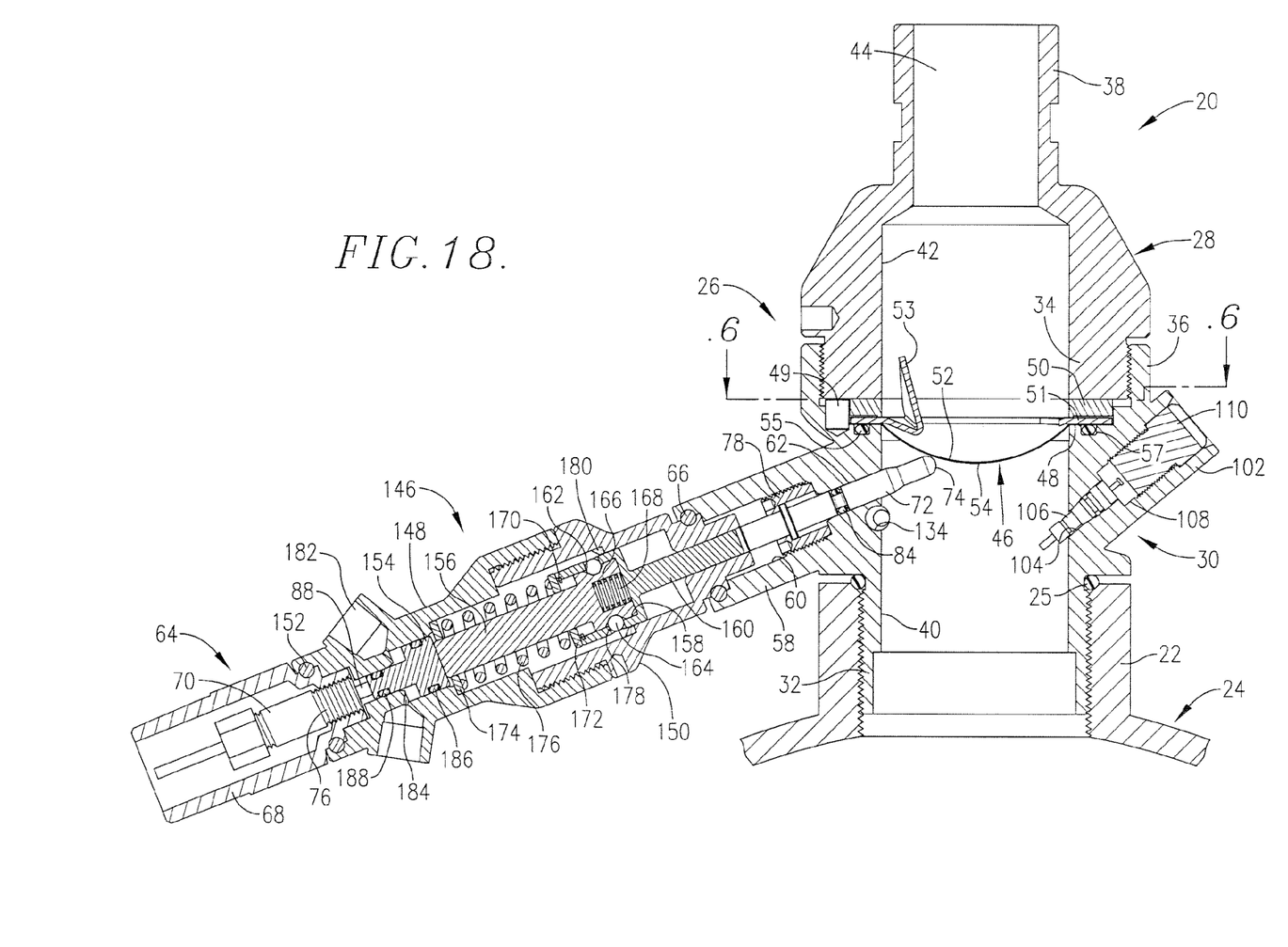
FIG. 18 is a vertical cross-sectional view of the valve of FIG. 17 showing activation of the spring actuator.
Figure 19:
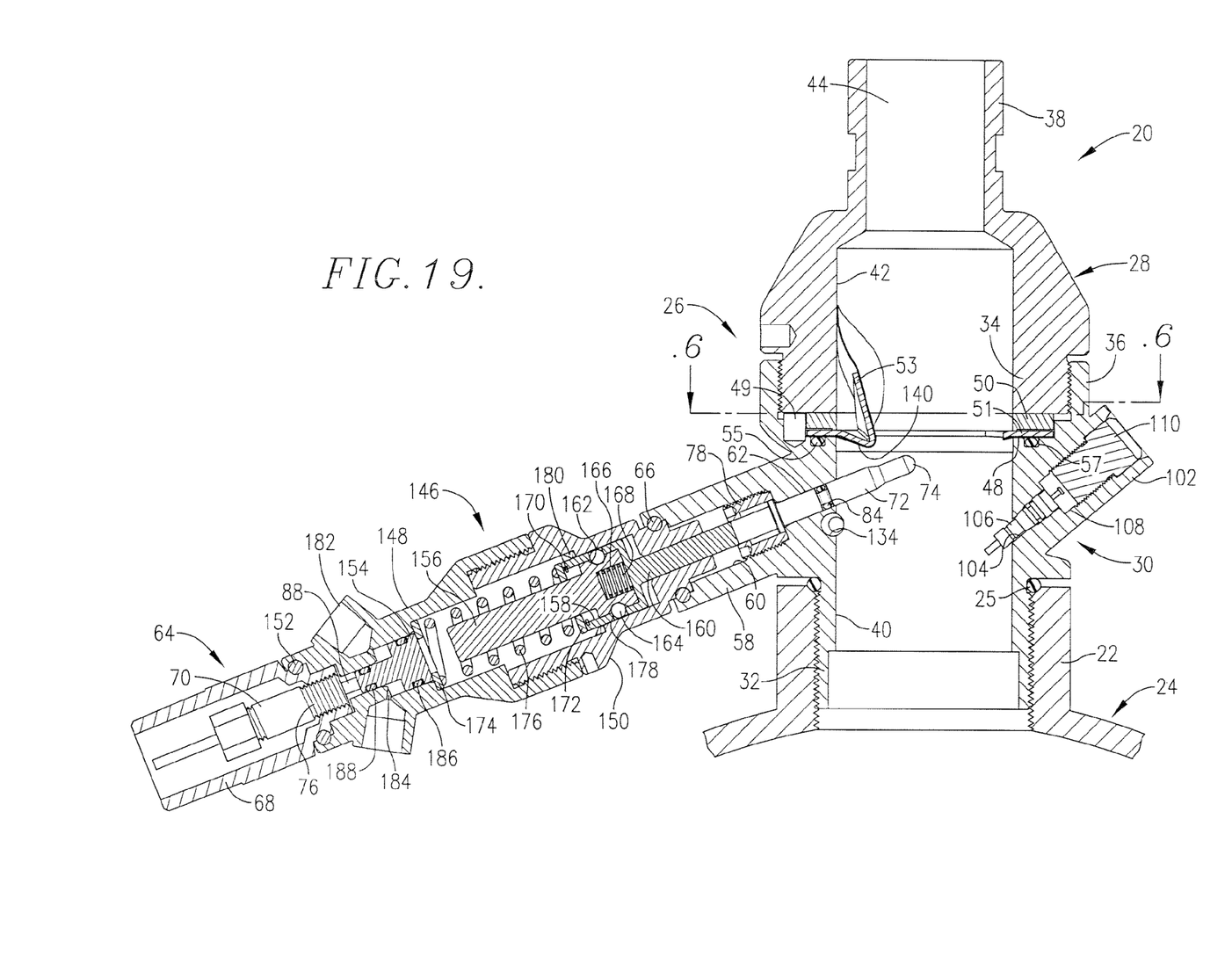
FIG. 19 is a vertical cross-sectional view of the valve of FIG. 17 showing the spring actuator in the fully deployed position.

Yet another embodiment of the present invention is depicted in FIGS. 17-19. This embodiment is very similar to the embodiment shown in FIGS. 1-9 and 16, except that a spring actuator mechanism 146 is positioned between actuator assembly 64 and protuberance 58. One function of the spring actuator 146 is to translate the force generated by thruster mechanism 70 into a much larger force that would act upon strike pin 72. Thus, spring actuator 146 is particularly suited for those applications in which thruster mechanism 70 is not by itself sufficient to cause strike pin 72 to contact rupture disc bulged portion 54 with the required level of force. By using spring actuator 146, a relatively large motive force output can be generated by the action of a relatively small motive force input.

Spring actuator 146 generally comprises a force input housing 148 threadably secured to a force output housing 150. Input housing 148 is coupled to actuator body 68 and secured by a retaining clip 152. Output housing 150 is secured to protuberance 58 by retaining clip 66. An actuation piston 154 is contained within input housing 148 and adjacent a profiled piston 156. Profiled piston 156 extends between input housing 148 and output housing 150 into an annular region 158 of plunger 160. Profiled piston 156 contains a plurality of recessed portions 162 configured to receive balls 164. The head of profiled piston 156 contains a hollowed-out portion 166 in which a spring 168 is received. Spring 168 also engages plunger 160 so as to bias profiled piston 156 and plunger 160 apart. The head of piston 156 is maintained within annular region 158 by a retaining ring 170. A washer 172 overlies ring 170 and effectively closes off annular region 158. A second washer 174 is provided so as to cooperate with washer 172 in providing surfaces against which main spring 176 coiled about profiled piston 156 exerts a force biasing plunger 160 toward strike pin 72. When in the un-activated position, balls 164 reside in orifices 178 formed in annular region 158 of plunder 160. Balls 164 rest up against seats 180 thus prohibiting shifting of plunger 160 in response to the force exerted thereupon by main spring 176.

As shown in FIG. 18, Upon activation of thruster mechanism 70, firing pin 88 contacts actuation piston 154 thereby shifting actuation piston 154 toward valve body 26. The shifting of actuation piston 154 causes profiled piston 156 also to shift in the same direction. The shifting of profiled piston 156 compresses spring 168 and causes orifices 178 to align with recessed portions 162. As a result of this alignment, seats 180 force balls 164 into recessed portions 162 and out of engagement with the seats. When in this configuration, balls 164 effectively lock profiled piston 156 and plunger 160 together to prohibit relative movement therebetween. Further, with balls 164 out of engagement with seats 180, main spring 176, which to this point has been under compression, acts upon the combined profiled piston 156 and plunger 160 assembly causing it to shift toward valve body 26 and into contact with strike pin 72.

FIG. 19 illustrates spring actuator 146 in its fully deployed position. As can be seen, actuation piston 154 and profiled piston 156 are no longer in contact with each other. Strike pin 72 has contacted bulged section 52 of rupture disc 46 thus initiating reversal and opening of the disc.

Spring actuator 146 may be actuated by means other than a thruster mechanism 70 which employs a pyrotechnic charge. Spring actuator 146 is provided with a plurality of fluid ports 182 that may be connected to a source of pressurized fluid, such as compressed air or nitrogen. Upon detection of conditions requiring activation of valve 20, the pressurized fluid may be delivered to ports 182. The ports 182 communicate with the interior of input housing 148 via passages 184. The pressurized fluid acts upon the head of actuation piston 154 causing the piston to shift toward valve body 26. O-rings 186, 188 located on actuation piston 154 prevent the pressurized fluid from escaping into other portions of spring actuator 146.

One of skill in the art would appreciate other means of actuating spring actuator 146, such as through the use of a solenoid. Therefore, the present invention is not merely limited to the above-described embodiments.

After activation, spring actuator 146 may be disconnected from protuberance 58 and reset for reuse. During resetting, plunger 160 is shifted back into output housing 150 thereby compressing main spring 176. Once plunger 160 and profiled piston 156 are sufficiently shifted towards input housing 148 and balls 164 have passed seats 180, balls 164 become displaced from recessed portions 162 thereby separating plunger 160 and profiled piston 156. Spring 168 shifts profiled piston 156 into contact with actuation piston 154, and both pistons 154 and 156 are returned to their initial position as shown in FIG. 17.

We claim:

1. A valve for controlling flow of pressurized fluid along a path leading from a confined area comprising:
    a valve body provided with a fluid passage and adapted to be mounted in said fluid path
    a reverse buckling rupture disc carried by the valve body in normal blocking relationship to flow of fluid through said passage, said disc having a bulged central section presenting a generally convex surface and a concave face, with the convex surface thereof in facing relationship to the pressurized fluid; and
    a selectively actuatable device carried by the body in disposition adjacent the convex surface of the central section of the disc that is operable upon actuation to disrupt, without puncturing, the disc to an extent that reversal of the central section of the disc is initiated by the pressurized fluid in said passage to allow flow of fluid through the valve passage.

2. A valve as set forth in claim 1, wherein said device includes a shiftable member normally spaced from the convex surface of the central section of the disc and movable through a displacement upon actuation to engage the convex surface and effect mechanical disruption thereof without puncture of the central section.

3. A valve as set forth in claim 2, wherein said member is a rod having a blunt end engageable with the convex surface of the bulged central section of the disc.

4. A valve as set forth in claim 2, wherein is provided a pyrotechnic charge operable to effect shifting of the member through said displacement thereof upon ignition of the charge.

5. A valve as set forth in claim 2, wherein said member is movable through a predetermined displacement sufficient only to effect disruption of the convex surface of the central section of the disc without puncturing the central section.

6. A valve as set forth in claim 2, wherein the central section of the disc reverses at a faster rate than movement of the member toward the disc upon initiation of reversal of the central section of the disc.

7. A valve as set forth in claim 2, wherein said member is movable along a generally rectilinear path of travel.

8. A valve as set forth in claim 2, wherein said member is movable along a generally curvilinear path of travel.

9. A valve as set forth in claim 2, wherein said member is movable along a path of travel of from about 6 mm to about 12 mm.

10. A valve as set forth in claim 1, wherein the rupture disc is of one piece metal and said bulged central section of the disc has a segment defining a discrete region in which the metal of the segment has altered grain structure that exhibits greater residual stress than the metal of the remainder of the central section of the disc, reversal of the central section of the disc being initiated at said discrete region thereof.

11. A valve as set forth in claim 10, wherein the convex surface and the concave face of the central section of the disc are smooth and of uninterrupted configuration throughout the entire area thereof including the segment defining said discrete region of the bulged central section.

12. A valve as set forth in claim 10, wherein said device is positioned to engage said discrete region of the disc to effect initiation of disruption of the central section of the disc at said discrete region.

13. A valve for controlling flow of pressurized fluid along a path leading from a confined area comprising:
    a tubular valve body provided with a fluid passage and adapted to be mounted in said fluid path;
    a reverse buckling rupture disc carried by the body in normal blocking relationship to flow of fluid through said passage, said disc having a bulged central section presenting a generally convex surface and a concave face, said central section of the disc being operable to resist reversal and rupture thereof under a predetermined first fluid pressure there against, said disc being disposed with the convex surface thereof in facing relationship to the pressurized fluid; and
    a selectively operable device carried by the body in disposition adjacent the convex surface of the central section of the disc that is operable upon actuation to mechanically disrupt, without puncturing, the central section of the disc to an extent that reversal of the central section of the disc is initiated at a predetermined second fluid pressure that is less than said first predetermined pressure to allow flow of fluid through the valve passage.

14. A valve as set forth in claim 13, wherein said device includes a shiftable member normally spaced from the convex surface of the central section of the disc and movable through a displacement to engage the convex surface and effect disruption thereof without puncture of the central section.

15. A valve as set forth in claim 14, wherein said member is movable toward the central section of the disc in generally tangential relationship to the convex surface thereof.

16. A valve as set forth in claim 13, wherein said member is movable toward the central section of the disc in generally perpendicular relationship to the convex surface thereof.

17. A method for controlling flow of pressurized fluid along a path leading from a confined area comprising the steps of:
    mounting a tubular valve body in said fluid path;
    providing a reverse buckling rupture disc in the body in normal blocking relationship to flow of pressurized fluid along said path, said disc having a bulged central section presenting a generally convex surface and a concave face, said central section of the disc being operable to resist reversal and rupture thereof under a predetermined first fluid pressure there against, said disc being disposed with the convex surface thereof in facing relationship to the pressurized fluid; and positioning a selectively operable device adjacent the convex surface of the central section of the disc for mechanically disrupting the convex surface without puncturing the central section of the disc to initiate reversal thereof at a predetermined second pressure less than said first predetermined pressure to allow flow of fluid along said path.

18. A method as set forth in claim 17, wherein said second pressure is no more than about one-half of said predetermined first pressure.

19. A method as set forth in claim 17, wherein said second pressure is no more than about one-fifth of said predetermined first pressure.

* * * * *